US007007748B2

(12) United States Patent
Gordon et al.

(10) Patent No.: US 7,007,748 B2
(45) Date of Patent: Mar. 7, 2006

(54) INDIRECT WATER HEATER AND METHOD OF MANUFACTURING SAME

(75) Inventors: Michael Gordon, East Grand Rapids, MI (US); Wade Bernreuter, Wyoming, MI (US)

(73) Assignee: Bradford White Corporation, Ambler, PA (US)

( * ) Notice: Subject to any disclaimer, the term of this patent is extended or adjusted under 35 U.S.C. 154(b) by 39 days.

(21) Appl. No.: 10/677,038

(22) Filed: Sep. 30, 2003

(65) Prior Publication Data

US 2005/0067154 A1    Mar. 31, 2005

(51) Int. Cl.
*F28D 1/02*    (2006.01)
(52) U.S. Cl. .................. 165/163; 219/481; 165/178
(58) Field of Classification Search .............. 165/162, 165/163, 178; 285/139.1, 201; 122/31.1, 122/32, 33; 392/465, 501, 480, 481; 29/890.03, 29/890.036, 890.051
See application file for complete search history.

(56) References Cited

U.S. PATENT DOCUMENTS

| 149,361 | A | * | 4/1874 | Van ............................. 165/163 |
| 591,505 | A | * | 10/1897 | Shepard et al. ................ 122/32 |
| 1,062,015 | A | * | 5/1913 | Lane ......................... 285/139.1 |
| 1,070,175 | A | | 8/1913 | Ponninghaus |
| 1,240,101 | A | | 9/1917 | Thompson |
| 1,255,835 | A | | 2/1918 | Shaug |
| 1,560,528 | A | * | 11/1925 | Baum ........................... 122/32 |
| 1,611,764 | A | * | 12/1926 | Mendelson .................... 122/32 |
| 1,717,490 | A | * | 6/1929 | Blanding ...................... 165/163 |
| 1,762,522 | A | * | 6/1930 | Newell ......................... 122/32 |
| 1,805,321 | A | * | 5/1931 | Ullman ......................... 122/32 |
| 1,921,259 | A | * | 8/1933 | Olson .......................... 165/163 |
| 1,959,933 | A | | 5/1934 | Simsohn |
| 2,051,311 | A | * | 8/1936 | Moore .......................... 122/32 |
| 2,098,211 | A | * | 11/1937 | Schulse ....................... 165/178 |
| 2,252,046 | A | | 8/1941 | Steele |
| 2,255,956 | A | | 9/1941 | Watt |
| 2,303,197 | A | | 11/1942 | Canfield |
| 2,327,339 | A | | 8/1943 | Chandler |
| 2,345,209 | A | | 3/1944 | Moore |
| 2,348,610 | A | | 5/1944 | Colby |
| 2,348,835 | A | | 5/1944 | Mueller |
| 2,359,547 | A | | 10/1944 | Colby |
| 2,373,731 | A | | 4/1945 | Wilson et al. |

(Continued)

FOREIGN PATENT DOCUMENTS

DE    2430825    1/1976

(Continued)

OTHER PUBLICATIONS

Dunkirk, Artesian Indirect Water Heater, catalog, Rev. Jul. 2001.

(Continued)

*Primary Examiner*—Teresa J. Walberg
(74) *Attorney, Agent, or Firm*—RatnerPrestia

(57) ABSTRACT

A heat exchange assembly adapted for use in a water tank is provided. The heat exchange assembly includes a tube having end portions and a coiled portion between the end portions. A fitting is connected to at least one of the end portions of the tube. The fitting has an end configured to extend through an opening in the water tank, and a surface positioned to limit the extension of the end through the opening in the water tank. The fitting also has an opposite end defining a bore configured to receive one of the end portions of the tube and to limit the extension of the end portion of the tube into the opposite end of the fitting. The bore extends axially beyond the surface of the fitting.

39 Claims, 16 Drawing Sheets

U.S. PATENT DOCUMENTS

| Patent No. | | Date | Inventor | Ref. |
|---|---|---|---|---|
| 2,399,985 | A | 5/1946 | Chandler | |
| 2,533,508 | A | 12/1950 | Riu | |
| 2,539,469 | A | 1/1951 | Powers | |
| 2,569,757 | A | 10/1951 | Gubson | |
| 2,642,046 | A | 6/1953 | Alexander | |
| 2,704,188 | A | 3/1955 | Bergmann | |
| 2,798,744 | A * | 7/1957 | Budnick et al. | 285/139.1 |
| 3,171,597 | A | 3/1965 | Baler | |
| 3,201,045 | A | 8/1965 | Davidson et al. | |
| 3,254,839 | A | 6/1966 | McClanahan et al. | |
| 3,341,122 | A | 9/1967 | Whittell, Jr. | |
| 3,492,461 | A | 1/1970 | Lawrence | |
| 3,545,534 | A | 12/1970 | Coles | |
| 3,793,992 | A | 2/1974 | Marquez | |
| 3,828,847 | A | 8/1974 | Stein | |
| 3,844,948 | A * | 10/1974 | Burke et al. | 210/177 |
| 3,882,693 | A | 5/1975 | Borovina et al. | |
| 3,896,992 | A | 7/1975 | Borovina et al. | |
| 3,958,755 | A | 5/1976 | Cleer, Jr. | |
| 4,005,681 | A * | 2/1977 | Lockett | 165/162 |
| 4,030,540 | A | 6/1977 | Roma | |
| 4,036,621 | A * | 7/1977 | Burton | 165/172 |
| 4,037,785 | A | 7/1977 | Madern | |
| 4,052,000 | A | 10/1977 | Honikman | |
| 4,143,816 | A * | 3/1979 | Skadeland | 165/163 |
| 4,149,673 | A | 4/1979 | Hapgood | |
| 4,158,438 | A | 6/1979 | Hapgood | |
| 4,167,211 | A | 9/1979 | Haller | |
| 4,193,180 | A | 3/1980 | Press | |
| 4,201,264 | A * | 5/1980 | Platt | 162/162 |
| 4,202,406 | A | 5/1980 | Avery | |
| 4,238,873 | A | 12/1980 | Frank et al. | |
| 4,253,446 | A | 3/1981 | Müller | |
| 4,267,826 | A | 5/1981 | Hitt, Jr. | |
| 4,272,667 | A * | 6/1981 | Golowacz | 165/162 |
| 4,273,160 | A | 6/1981 | Lowles | |
| 4,282,861 | A | 8/1981 | Roark | |
| 4,296,799 | A | 10/1981 | Steele | |
| 4,309,982 | A | 1/1982 | Oquidam | |
| 4,328,791 | A | 5/1982 | Moore, Jr. et al. | |
| 4,345,583 | A | 8/1982 | Morin | |
| 4,353,410 | A | 10/1982 | Godard et al. | |
| 4,426,037 | A | 1/1984 | Bernstein | |
| 4,461,347 | A | 7/1984 | Layton et al. | |
| 4,480,631 | A | 11/1984 | Kristensen | |
| 4,545,365 | A | 10/1985 | Wetzel, Jr. | |
| 4,637,347 | A | 1/1987 | Troy | |
| 4,738,394 | A | 4/1988 | Ripka et al. | |
| 4,821,682 | A | 4/1989 | Waters | |
| 4,949,680 | A | 8/1990 | Kale | |
| 4,972,902 | A | 11/1990 | Ninomiya | |
| 5,037,510 | A | 8/1991 | Nygards | |
| 5,081,696 | A | 1/1992 | Beck | |
| 5,136,985 | A | 8/1992 | Krowech | |
| 5,178,207 | A | 1/1993 | Bergqvist et al. | |
| 5,224,674 | A | 7/1993 | Simons | |
| 5,228,413 | A | 7/1993 | Tam | |
| 5,372,185 | A | 12/1994 | Lannes | |
| 5,485,879 | A | 1/1996 | Lannes | |
| 5,787,722 | A * | 8/1998 | Jenkins | 165/162 |
| 5,971,444 | A * | 10/1999 | Hawkins | 285/201 |
| 6,098,705 | A * | 8/2000 | Kim | 165/163 |
| 6,789,615 | B1 * | 9/2004 | Michelfelder et al. | 165/163 |

FOREIGN PATENT DOCUMENTS

| | | |
|---|---|---|
| DE | 3906715 A1 | 9/1990 |
| FR | 2412807 | 7/1979 |
| FR | 2469667 | 5/1981 |
| JP | 57-49760 | 3/1982 |

OTHER PUBLICATIONS

Kevin Rafferty Geo-Heat Center, "Domestic Hot Water Heating," article, Sep. 2001, pp. 18-21, GHC Bulletin.

* cited by examiner

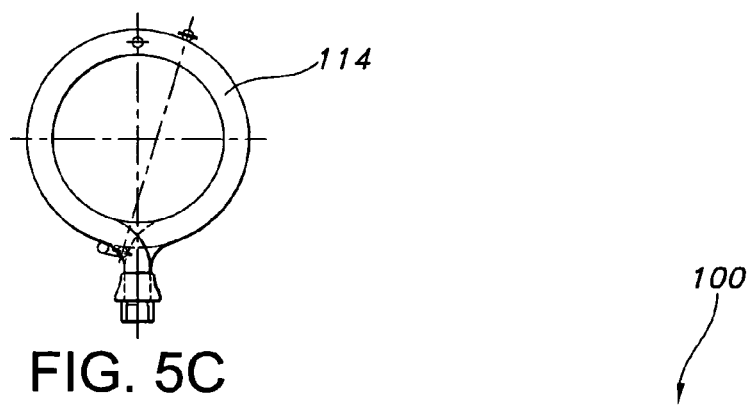
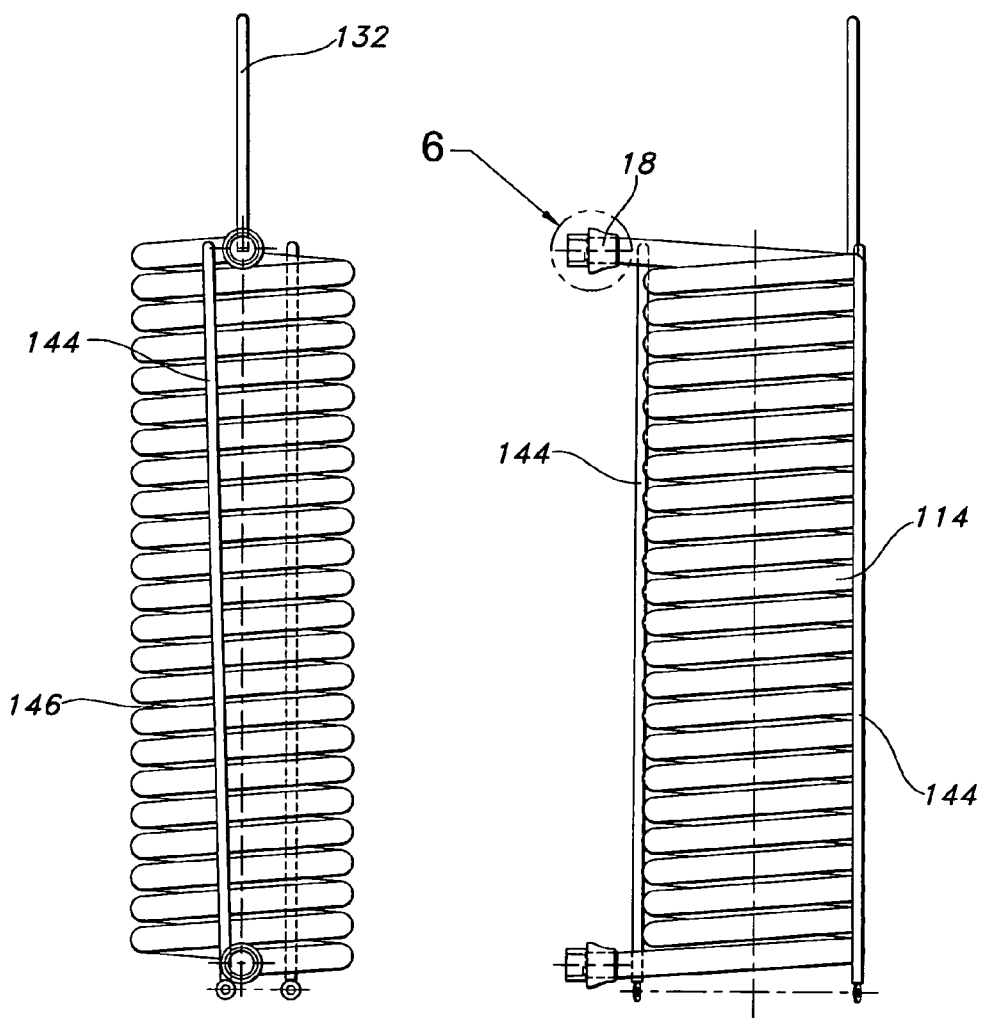
FIG. 5C
FIG. 5A
FIG. 5B

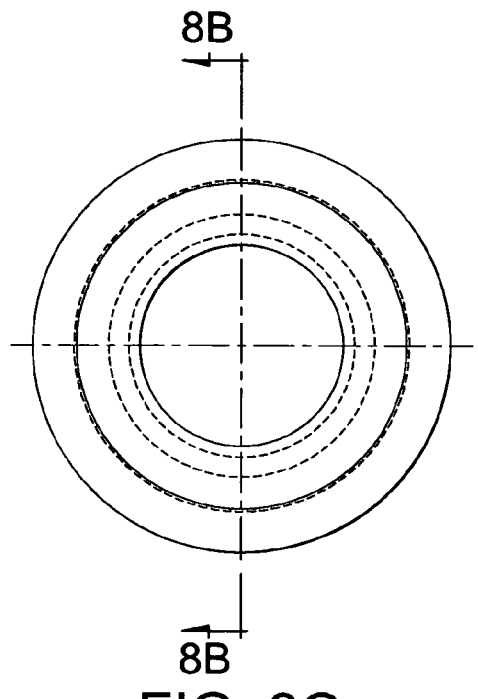
FIG. 8C
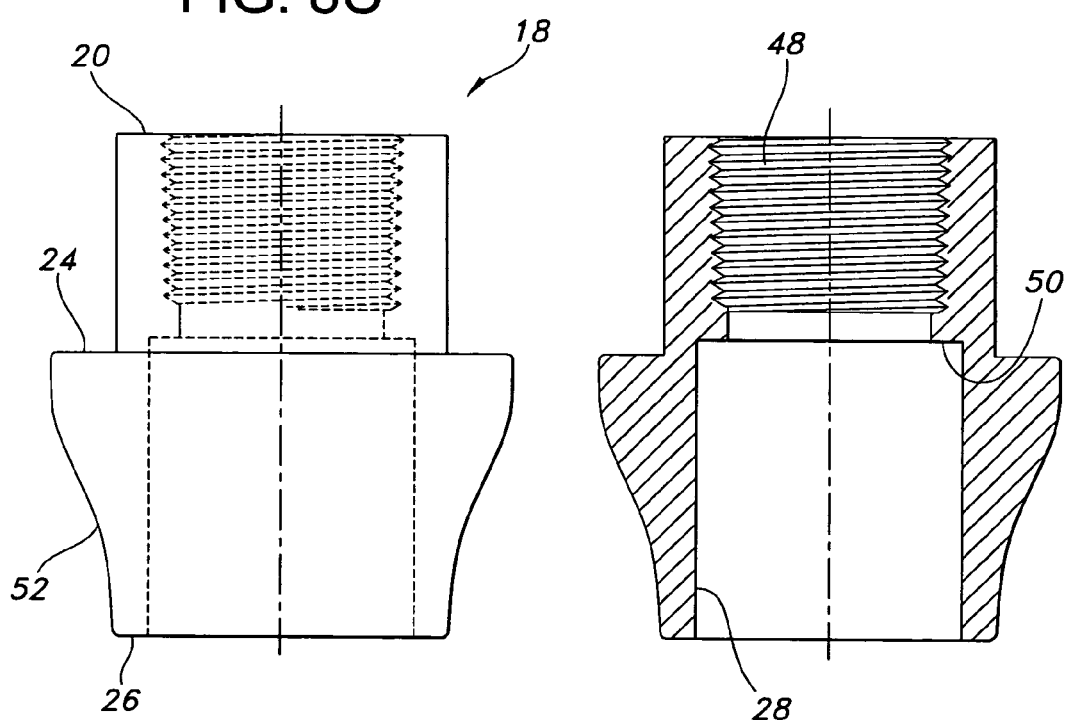
FIG. 8A
FIG. 8B

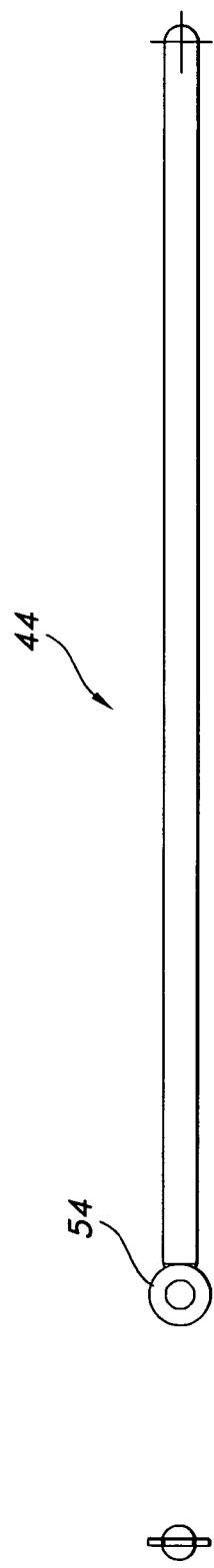

INDIRECT WATER HEATER AND METHOD OF MANUFACTURING SAME

FIELD OF THE INVENTION

The present invention relates to an indirect water heater and, more particularly, to a heat exchange assembly adapted for use in a water tank.

BACKGROUND OF THE INVENTION

There has long been a need for compact yet efficient appliances to be installed within living areas in single and multi-family dwellings as well as in commercial establishments.

Referring specifically to water heater systems that utilize heat exchangers, for example, increased heat transfer can be accomplished by increasing the heat exchange surface area. However, such an increase in heat exchange surface area is not always conducive to the space constraints within compact water heater systems. In other words, the size of the components necessary to achieve a high efficiency water heater system competes with the need for a compact system.

Attempts have been made to provide a compact yet efficient system for supplying hot water. For example, U.S. Pat. No. 5,485,879 to Lannes discloses a combined water heating system for domestic or commercial use capable of heating water for consumption as well as for space heating. The '879 system comprises a heat exchanger incorporated into a standard, glass-lined water heater system. While the '879 system represents a significant improvement over prior systems, continued improvements are sought.

Accordingly, there continues to be a need for increasingly compact and efficient water heater systems.

SUMMARY OF THE INVENTION

In one exemplary embodiment, this invention provides a heat exchange assembly adapted for use in a water tank. The heat exchange assembly includes a tube having end portions and a coiled portion between the end portions. A fitting is connected to at least one of the end portions of the tube. The fitting has an end configured to extend through an opening in the water tank, and a surface positioned to limit the extension of the end through the opening in the water tank. The fitting also has an opposite end defining a bore configured to receive one of the end portions of the tube and to limit the extension of the end portion of the tube into the opposite end of the fitting. The bore extends axially beyond the surface of the fitting.

In another exemplary embodiment, a coiled heat exchanger configured for use in a water heater is provided. The coiled heat exchanger includes a coiled tube for directing the flow of fluid through the heat exchanger. The coiled tube has a tube outer diameter and a coil inner radius, wherein the ratio of the outer diameter of the tube to the coil inner radius is about 0.19:1 or greater.

In yet another exemplary embodiment, a system for heating water is provided. The water heating system includes a water storage tank adapted to contain a water supply, and at least one tube connected to contain a recirculating water supply. The tube is mounted within the water storage tank and has at least one end portion fixed with respect to the water storage tank, and a coiled portion extending from the end portion. A fitting is connected to the end portion of the tube and to the water storage tank. The fitting is oriented along a first direction and configured to reduce movement of the end portion of the tube with respect to the water storage tank along the first direction. A reinforcement member is coupled to the coiled portion of the tube and to the water storage tank. The reinforcement member is oriented along a second direction substantially perpendicular to the first direction and configured to reduce movement of the coiled portion of the tube with respect to the water storage tank along the second direction.

In still another exemplary embodiment, in a system for heating water having a water storage tank adapted to contain a water supply and a tube assembly connected to contain a recirculating water supply, a method for mounting the tube assembly within the water storage tank is provided. The method includes the step of coupling a fitting of the tube assembly to the water storage tank along a first direction, thereby reducing movement of the tube assembly with respect to the water storage tank along the first direction. The method further includes the step of attaching a reinforcement member of the tube assembly to the water storage tank along a second direction substantially perpendicular to the first direction, thereby reducing movement of the tube assembly with respect to the water storage tank along the second direction.

BRIEF DESCRIPTION OF THE DRAWINGS

FIG. 5A is a front view of another exemplary embodiment of a heat exchange assembly illustrating a coiled tube, fittings, support members, and a reinforcement member according to aspects of this invention;

FIG. 5B is a right side view of the heat exchange assembly illustrated in FIG. 5A;

FIG. 5C is a top view of the heat exchange assembly illustrated in FIG. 5A;

FIG. 8A is a side view of the fitting component of the heat exchange assembly illustrated in FIGS. 2A and 5A;

FIG. 8B is a cross-sectional side view of the fitting illustrated in FIG. 8A;

FIG. 8C is an end view of the fitting illustrated in FIG. 8A;

FIG. 10A is a side view of the support member component of the heat exchange assembly illustrated in FIGS. 2A and 5A;

FIG. 10B is an end view of the support member illustrated in FIG. 10A;

FIG. 11A top view of the water tank head component of the water heating system illustrated in FIG. 1;

FIG. 11B is a side view of the water tank head illustrated in FIG. 11A;

DETAILED DESCRIPTION OF THE INVENTION

Figure 1:
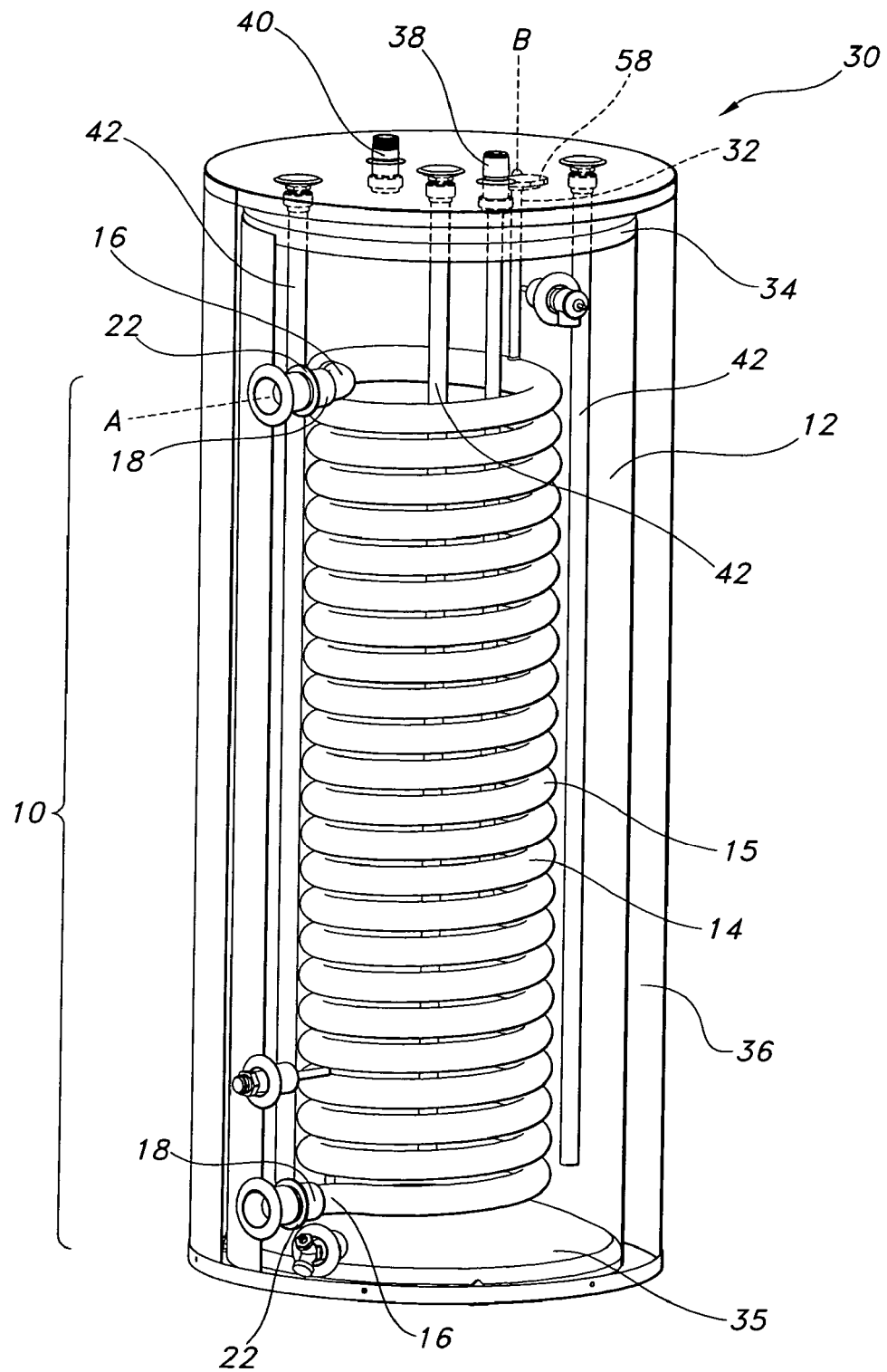
FIG. 1 is a front cutaway view of an exemplary embodiment of a system for heating water including a water tank according to aspects of this invention.

Although the invention is illustrated and described herein with reference to specific embodiments, the invention is not intended to be limited to the details shown. Rather, various modifications may be made in the details within the scope and range of equivalents of the claims and without departing from the invention.

Referring to the figures generally, in an exemplary embodiment a heat exchange assembly 10 adapted for use in a water tank 12 is provided. The heat exchange assembly 10 includes a tube 14 having end portions 16 and a coiled portion 15 between the end portions 16. A fitting 18 is connected to each of the end portions 16 of the tube 14. Each fitting 18 has an end 20 configured to extend through an opening 22 in the water tank 12 and a surface 24 positioned to limit the extension of the end 20 through the opening 22 in the water tank 12. Each fitting 18 also has an opposite end 26 defining a bore 28 configured to receive one of the end portions 16 of the tube 14 and to limit the extension of the end portion 16 of the tube 14 into the opposite end 26 of the fitting 18. The bore 28 extends axially beyond the surface 24 of the fitting 18.

In another exemplary embodiment, a coiled heat exchanger 10 configured for use in a water heater 12 is provided. The coiled heat exchanger 10 includes a coiled tube 14 for directing the flow of fluid through the heat exchanger 10. The coiled tube 14 has a tube outer diameter "D" and a coil inner radius "R," wherein the ratio of the outer diameter "D" of the tube 14 to the coil inner radius "R" is about 0.19:1 or greater.

In yet another exemplary embodiment, a system 30 for heating water is provided. The water heating system 30 includes a water storage tank 12 adapted to contain a water supply and a tube 14 connected to contain a recirculating water supply. The tube 14 is mounted within the water storage tank 12 and has end portions 16 fixed with respect to the water storage tank 12, and a coiled portion 15 extending from the end portions 16. A fitting 18 is connected to each end portion 16 of the tube 14 and to the water storage tank 12. The fitting 18 is oriented along a first direction "A" and configured to reduce movement of the tube 14 with respect to the water storage tank 12 along the first direction "A." A reinforcement member 32 is coupled to the coiled portion 15 of the tube 14 and to the water storage tank 12. The reinforcement member 32 is oriented along a second direction "B" substantially perpendicular to the first direction "A" and is configured to reduce movement of the coiled portion 15 of the tube 14 with respect to the water storage tank 12 along the second direction "B."

In still another exemplary embodiment, in a system 30 for heating water having a water storage tank 12 adapted to contain a water supply and a tube 14 connected to contain a recirculating water supply, a method for mounting the tube 14 within the water storage 12 tank is provided. The method includes the step of connecting a fitting 18 to the tube 14 and to the water storage tank 12. The fitting 18 is oriented along a first direction "A" and configured to reduce movement of the tube 14 with respect to the water storage tank 12 along the first direction "A." The method further includes the step of attaching a reinforcement member 32 to the tube 14 and to the water storage tank 12. The reinforcement member 32 is oriented along a second direction "B" substantially perpendicular to the first direction "A" and configured to reduce movement of the tube 14 with respect to the water storage tank 12 along the second direction "B."

Referring now to FIG. 1, a heat exchange assembly embodying exemplary aspects of this invention is generally designated by the numeral "10." FIG. 1 depicts a commercial or residential water heater. However, the descriptions herein apply to commercial water heaters and residential or domestic water heaters, as well as other heat transfer systems.

The heat exchange assembly 10 is adapted for use in a water tank 12 provided with a cover portion such as a head assembly 34, and a base 35. The heat exchange assembly 10 includes a tube 14 having end portions 16 and a coiled portion 15 between the end portions 16. A fitting 18 is connected to each of the end portions 16 of the tube 14 and to the water storage tank 12. The fittings 18 are oriented along a first direction "A" and configured to reduce movement of the tube 14 with respect to the water storage tank 12 along the first direction "A." An outer jacket 36 is configured to surround the water tank 12. The space between the outer wall surface of the water tank 12 and the inner wall surface of the outer jacket 36 will be at least partially filled with insulation (not shown).

A reinforcement member 32 is attached to the tube 14 and to the water storage tank 12. The reinforcement member 32 is oriented along a second direction "B" substantially perpendicular to the first direction "A," and is configured to reduce movement of the tube 14 with respect to the water storage tank 12 along the second direction "B."

The exemplary reinforcement member 32 is attached to the tube 14 via a weld. However, such attachment is not limited to a weld, as the reinforcement member 32 may be attached to the coiled tube 14 via fasteners, high-temperature waterproof adhesive, or any other suitable means of securing the components. The exemplary reinforcement member 32 is attached to the water storage tank 12 also via a weld, as will be described subsequently with reference to FIGS. 15 and 16.

The head assembly 34 and the base 35 are welded to the top and bottom (respectively) of the water tank 12 to form watertight seals for the containment of water (or other fluids) within the water tank 12. The head assembly is configured to include a cold water supply 38 and a hot water outlet 40. Furthermore, the water tank 12 is equipped with multiple sacrificial anodes 42 to protect the tank 12 from corrosion.

Figure 2C:
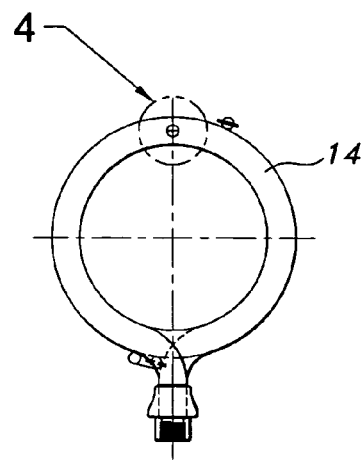
FIG. 2C is a top view of the heat exchange assembly illustrated in FIG. 2A.
Figure 2A:
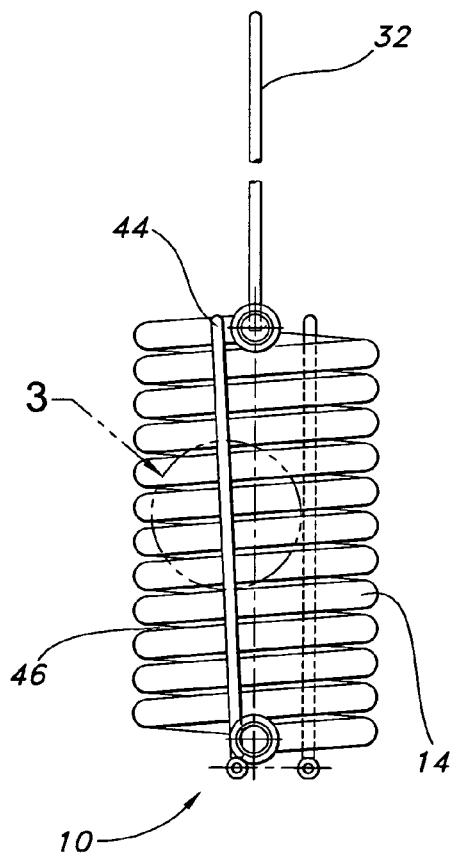
FIG. 2A is a front view of an exemplary embodiment of a heat exchange assembly illustrating a coiled tube, fittings, support members, and a reinforcement member according to aspects of this invention.
Figure 2B:
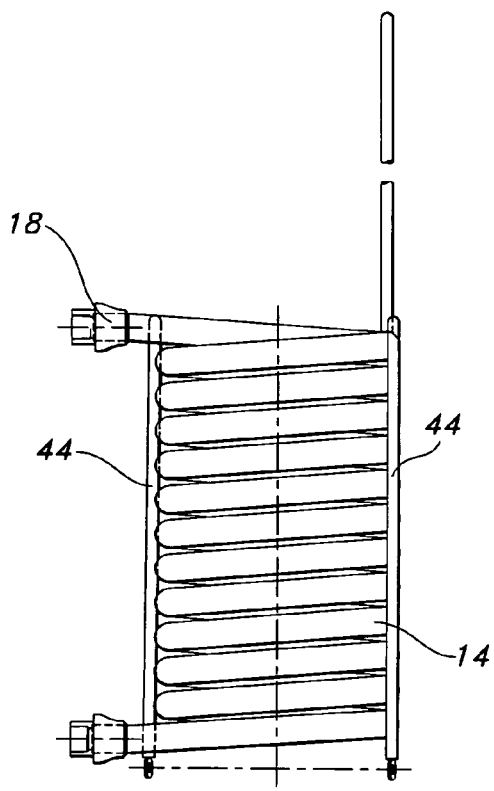
FIG. 2B is a right side view of the heat exchange assembly illustrated in FIG. 2A.

FIGS. 2A–2C illustrate a heat exchange assembly 10 specifically sized for residential or domestic water heaters. The tube 14 is coiled for directing the flow of fluid through the heat exchange assembly 10. As described previously, a fitting 18 is connected to each of the end portions 16 of the tube 14, and a reinforcement member 32 is also attached to the tube 14. Support members 44 contact the coils of the tube 14. The coils are spaced evenly apart, as represented by gaps 46. The size of the gaps 46 may be increased or decreased to accommodate various dimensional constraints. For example, the size of the exemplary gaps 46 may be 3/8 inch. However, the size of the gaps 46 is not limited to 3/8 inch, and may be any other suitable larger or smaller dimension.

By maintaining even spacing between adjacent coils 15 of the tube 14, the support members 44 reduce or eliminate any noise caused by coil vibration. The support members 44 also maximize the heat transfer surface area by preventing contact between adjacent coils 15. Furthermore, even spacing between the coils 15 improves water circulation between adjacent coils 15, thereby decreasing stratification by permitting horizontal water flow during operation of the water heating system 30.

Figure 3:
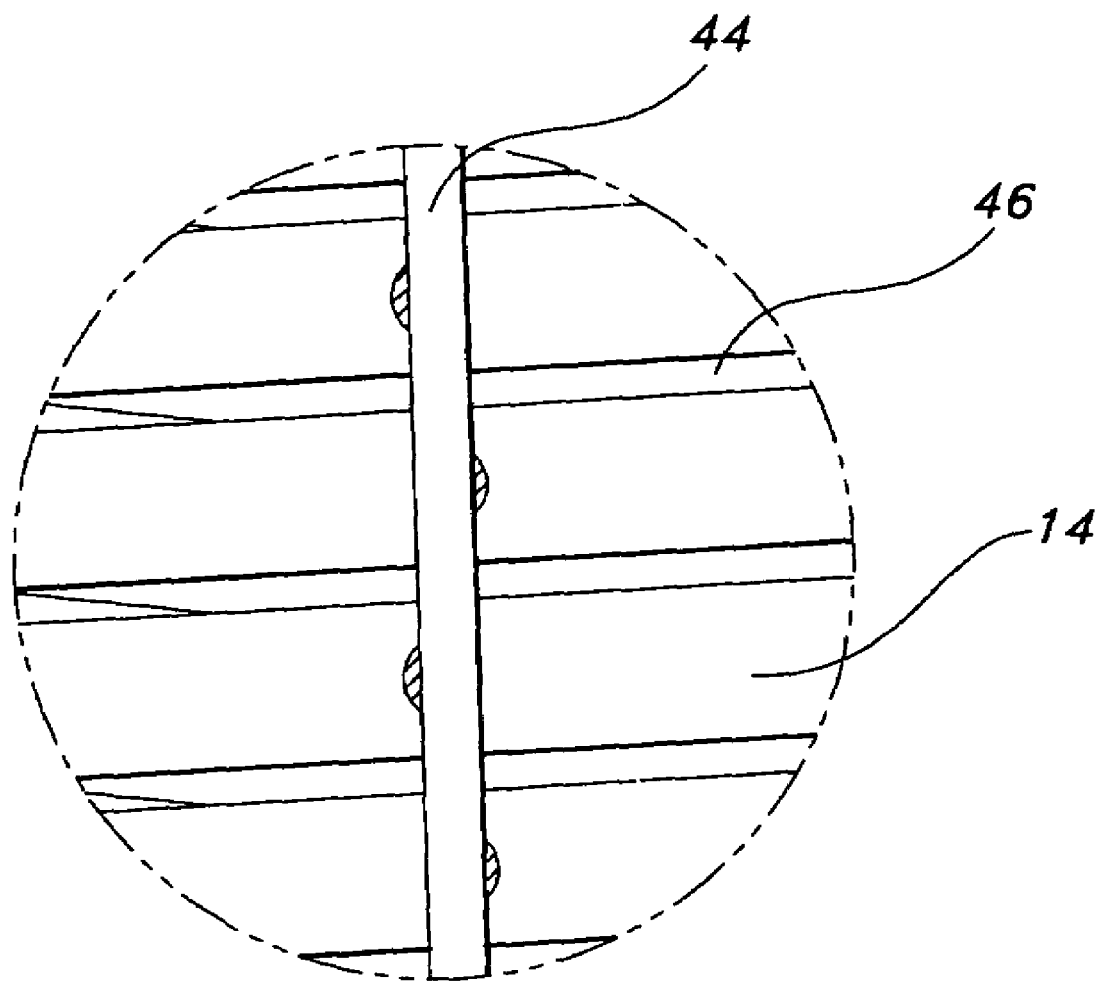
FIG. 3 is a detail view of the heat exchange assembly illustrated in FIG. 2A showing a support member welded to the coiled tube.

As illustrated in FIG. 3, the support members 44 are welded on alternating sides at every convolution of the coiled tube 14. However, the present invention is not limited to welds, as the support members 44 may be attached to the coiled tube 14 via fasteners, high-temperature waterproof adhesive, or any other suitable means of securing the components. Such a configuration reduces movement of the coils 15 with respect to one another, assisting in securing the overall stability of the heat exchange assembly 10 within the water tank 12.

Specifically referring to FIG. 3, which illustrates an embodiment in which a support member 44 is tack welded to the coiled tube 14, the weld has been minimized to reduce oxidation in the tank and to reduce labor costs. By applying tack welds to alternating sides of support member 44 on adjacent coils of the coiled tube 14, the structural integrity of the support is maintained while reducing the amount of weld in the tank. More specifically, by alternating the sides of support member 44 that are tack welded to the coiled tube 14, the support member 44 is prevented from rolling about its longitudinal axis. Such rolling may be more apt to occur if the support member 44 were to be welded along only one of its sides. Also, in the configuration illustrated in FIG. 3, every convolution of the coiled tube 14 is fixed to the support member 44.

Figure 4:
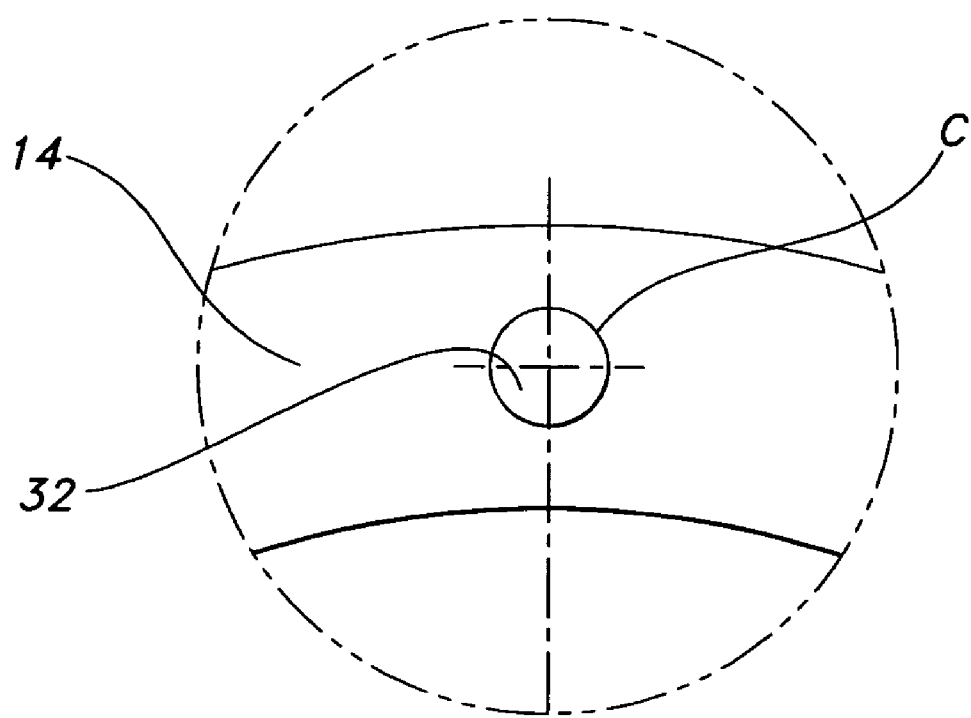
FIG. 4 is a detail view of the heat exchange assembly illustrated in FIG. 2C showing the location of the reinforcement member toward the center of the coiled tube.

FIG. 4 illustrates the location "C" of the reinforcement member 32 at the center of the convolution of the coiled tube 14. More specifically, location "C" is the position at which the reinforcement member 32 is attached to the tube 14 via a weld.

FIGS. 5A–5C illustrate a heat exchange assembly 100 specifically sized for commercial water heaters. The tube 114 is coiled for directing the flow of fluid through the heat exchange assembly 100. As described previously, a fitting 18 is connected to each of the end portions 116 of the tube 114, and a reinforcement member 132 is also attached to the tube 114. Support members 144 contact the coils of the tube 114. The coils are spaced evenly apart, as represented by gaps 146. The size of the gaps 146 may be increased or decreased to accommodate various dimensional constraints. For example, the size of the exemplary gaps 146 may be 3/8 inch. However, the size of the gaps 146 is not limited to 3/8 inch, and may be any other suitable larger or smaller dimension. The components and configurations described herein with reference to FIGS. 1–4 and 6–15 apply to the heat exchange assembly 100 represented here as well.

Figure 6:
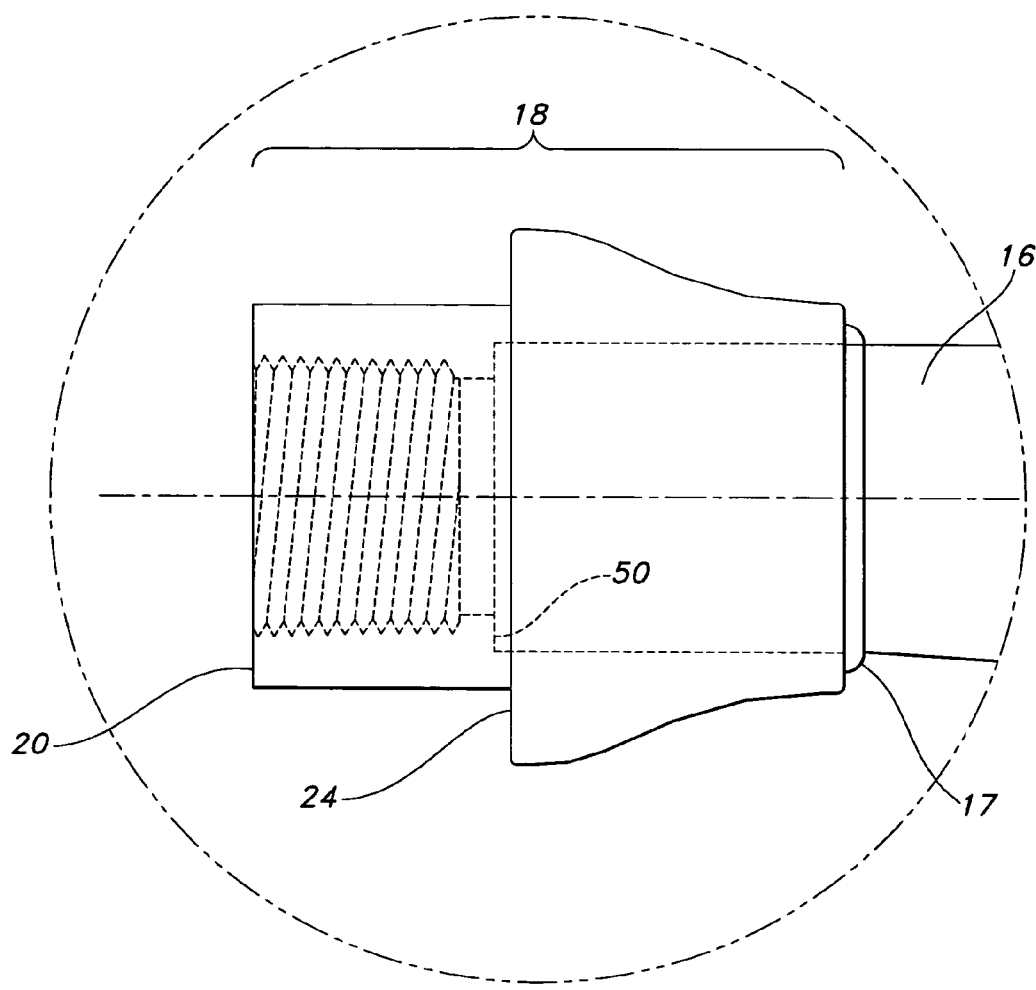
FIG. 6 is a detail view of the heat exchange assembly illustrated in FIG. 5B showing the fitting connected to an end portion of the tube.

FIG. 6 illustrates a fitting 18 attached to an end portion 16 of tube 14. The exemplary fitting 18 is welded to the end portion 16 of the tube 14 at weld 17. The details of the fitting 18 will be described subsequently with reference to FIGS. 8A–8C.

Figure 7C:
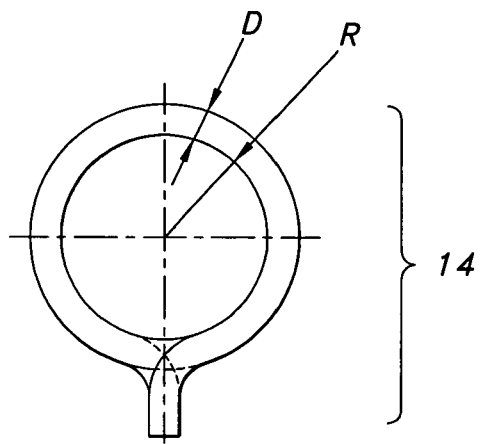
FIG. 7C is a top view of the coiled tube illustrated in FIG. 7A.
Figure 7A:
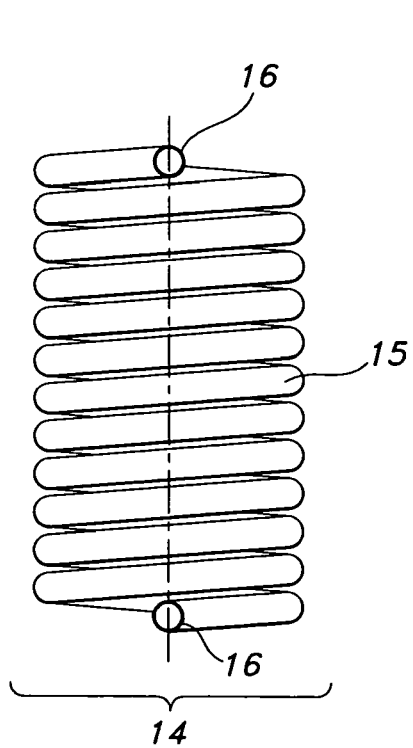
FIG. 7A is a front view of the coiled tube component of the heat exchange assembly illustrated in FIG. 2A.
Figure 7B:
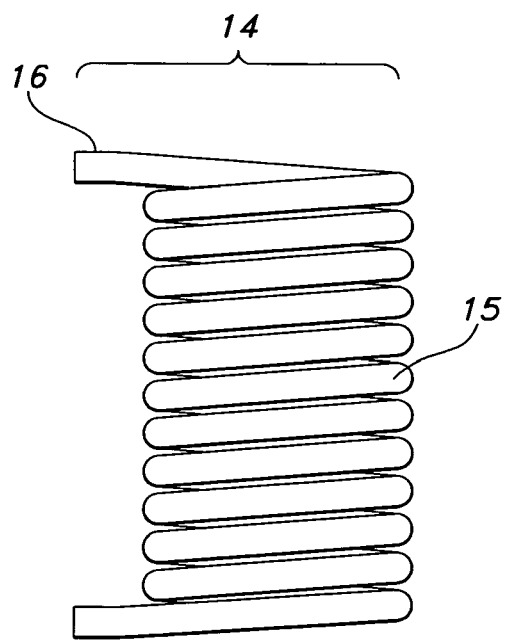
FIG. 7B is a right side view of the coiled tube illustrated in FIG. 7A.

FIGS. 7A–7C show that the coiled tube 14 has a tube outer diameter "D" and a coil inner radius "R." The dimensions of the coiled tube 14 may vary depending upon practical considerations or the load requirements of the water heating system. For example, an increase in the diameter "D" of the coiled tube 14 and the overall length of the tube 14 (straightened) will increase the surface area over which heat exchange may occur, thereby increasing the output of the system (in BTUs). More specifically, the heat exchange surface area is defined by the circumference of the tube 14 ($\pi D$) times the overall straight length of the tube (L). Accordingly, the heat exchange surface area ($\pi DL$) increases proportionately as the diameter D or the length L is increased. Such an increase in surface area increases the transfer of heat from recirculating water (or other fluid) in the tube 14 to water in the tank 12 or from water in the tank 12 to recirculating water (or other fluid) in the tube 14.

Furthermore, an increase in the diameter "D" of the coiled tube 14 (with the associated increase in the inner diameter of the tube) will reduce the overall pressure drop realized by the heat exchange assembly 10. More specifically, a change in pressure ($\Delta P$) will result from the flow of water through the tube 14. That change in pressure, $\Delta P$, is the differential between the inlet pressure $P_{in}$ and the outlet pressure $P_{out}$. By increasing the diameter "D" of the tube 14, the change in pressure ($\Delta P$) is advantageously reduced. Such conditions allow for greater fluid flow through the tube 14. In other words, the greater the diameter "D" of the tube 14, the greater the volume of fluid transmitted through the tube 14 and reduced energy is required to urge the fluid through the tube 14. Such a reduced energy requirement allows for the use of a smaller pump or other circulation device to urge the fluid through the tube 14. A smaller circulation device is often smaller in size, less expensive, and a standard circulation device may be available.

Accordingly, it has been discovered that several advantages can be achieved by increasing the diameter "D" of the tube 14. Namely, an increase of diameter "D" proportionately increases the heat transfer surface area ($\pi DL$) for a given tube length (L), thereby increasing heat transfer. Also, increasing diameter "D" reduces the pressure drop $\Delta P$.

It has therefore been discovered that an efficient yet compact heat exchange system can be provided by maintaining or increasing the outer diameter "D" of the heat exchange tube 14 while maintaining or decreasing the radius "R" at which the tube 14 is coiled (measured from the center axis of the coil to the inner facing surface of the tube 14). This can be accomplished according to exemplary aspects of this invention by increasing the ratio of "D" to "R."

The ratio of the outer diameter "D" to the coil inner radius "R" is about 0.19:1 or greater according to one exemplary embodiment of this invention. According to another exemplary embodiment of this invention, the ratio of the outer diameter "D" to the coil inner radius "R" is about 0.25:1 or greater. According to yet another exemplary embodiment of this invention, the ratio is about 0.3:1 or greater. For each of these ratios, various outer diameters "D" can be selected. For example, according to one exemplary embodiment, an outer diameter "D" of about 1⅛ inches is optionally selected. According to other exemplary embodiments, an outer diameter "D" of about 1¼ inches or about 1½ inches is optionally selected. Other sizes are optionally selected as well, depending on engineering and design constraints and preferences.

Such a configuration reconciles the conflicting features of increased heat exchange surface area and reduced pressure drop, and the limited volume of highly desirable compact water heater systems. More specifically, the relatively large tube outer diameter "D" results in increased heat exchange surface area and a reduced pressure drop, both highly desirable characteristics. Concurrently, a ratio of about 0.19:1 or greater for the outer diameter "D" to the coil inner radius "R" makes it possible to fit the heat exchange assembly 10 within the space constraints of a compact water heater system while maintaining or increasing the level of heat transfer.

For example, and for purposes of illustration only, the exemplary embodiment of the tube 14 shown in FIG. 7C can be provided with an outer diameter "D" of about 1½ inches and a coil inner radius "R" of about 5 inches. Such a tube configuration would have a ratio of the outer diameter "D" to the coil inner radius "R" of about 0.3:1. It will be appreciated, however, that a wide variety of dimensions for outer diameter "D" and coil inner radius "R" can be selected within the scope of this invention.

The wall thickness of the tube 14 may be increased or decreased to facilitate the coiling process. For example, the wall thickness may be about 0.08 inch. However, the wall thickness is not limited to 0.08 inch, and may be any other larger or smaller dimension sufficient to avoid kinking of the tube 14 during the coiling process and suitable to maintain the shape of the finally coiled tube 14. The tube 14 is made from carbon steel such as A513-2 ERW (Electric Resistance Weld) material. However, the tube 14 of the present invention is not limited to carbon steel, and may be made from stainless steel, copper, or any other suitable conductive or metallic material.

Referring now to FIGS. 8A–8C, each fitting 18 has an end 20 configured to extend through an opening 22 in the water tank 12 (as illustrated in FIG. 1). The end defines female threads 48 for connection to other fittings external to the water heater. A surface, more specifically referred to as an exterior annular shoulder 24, is positioned to limit the extension of the end 20 through the opening 22 in the water tank 12. As explained previously, each fitting 18 is oriented along a first direction "A" and configured to reduce movement of the tube 14 with respect to the water storage tank 12 along the first direction "A." More specifically, the exterior annular shoulder 24 abuts against an interior surface of the water tank 12, thereby preventing the tube 14 and fitting 18 from extending through the opening 22 in the water tank 12 beyond a predetermined position. Such a configuration assists in securing the overall stability of the heat exchange assembly 10 within the water tank 12 during the various manufacturing, shipping, handling, installation, and operation processes.

Each fitting 18 also has an opposite end 26 defining a bore 28 configured to receive one of the end portions 16 of the tube 14, and sized to limit the extension of the end portion 16 of the tube 14 into the opposite end 26 of the fitting 18. Similar to the exterior annular shoulder 24, the configuration of the bore 28 limits the movement of the tube 14 with respect to the fitting 18 and the water storage tank 12 along the first direction "A." Furthermore, the fit between the end portion 16 of the tube 14 and the bore 28 helps limit the movement of the tube 14 with respect to the water storage tank 12 along second direction "B." As described in greater detail later, the configuration of the bore 28 in conjunction with the exterior annular shoulder 24 further assists in securing the overall stability of the heat exchange assembly 10 within the water tank 12 during the various manufacturing, shipping, handling, installation, and operation processes.

The bore 28 extends axially beyond the surface 24 of the fitting 18, and includes a counterbore defining an interior annular shoulder 50. The interior annular shoulder 50 limits the extension of the end portion 16 of the tube 14 into the opposite end 26 of the fitting 18. More specifically, the end portion 16 of the tube 14 abuts against the annular shoulder 50, thereby preventing the tube 14 from extending through the fitting 18 beyond the annular shoulder 50. Such a configuration in turn limits the movement of the tube 14 with respect to the water storage tank 12 along the first direction "A." Moreover, because the bore 28 extends axially beyond the surface 24 of the fitting 18, and because the surface 50 of the bore 28 is positioned axially beyond the surface 24 toward an exterior of the tank 12, the movement of the tube 14 is further limited with respect to the water storage tank 12 along second direction "B."

The configuration of the counterbore's interior annular shoulder 50 in relation to the annular shoulder surface 24 further assists in securing the overall stability of the heat exchange assembly 10 within the water tank 12 during the various manufacturing, shipping, handling, installation, and operation processes. Sturdy connections at the fittings 18 are desired because loose connections may lead to misalignment, leaks, or other system irregularities resulting in reduced system efficiency or system inoperability. In other words, the structural strength and integrity of the heat exchange assembly 10 placement within the water tank 12 contributes to the overall performance and reliability of the water heating system 30.

An outer surface 52 is tapered from the exterior annular shoulder 24 to the opposite end 26. The taper provides strain relief to preserve the integrity of the fitting 18 under axial and radial forces.

Increasing the diameter "D" of the tube 14, the wall thickness of the tube 14, and/or the ratio of the diameter "D" of the tube 14 to the radius "R" of the tube may increase the overall weight of the tube 14. As described previously, the fittings 18 provide some improved structural integrity to support the heavier tube 14. It has also been discovered that the water heating system 30 can be further strengthened by supporting the tube 14 along multiple axes, preferably perpendicular axes, and most preferably horizontal "A" and vertical "B" axes. As described previously, the reinforcement member 32 is configured to reduce movement of the tube 14 with respect to the water storage tank 12 along the second direction "B."

Figure 9A:
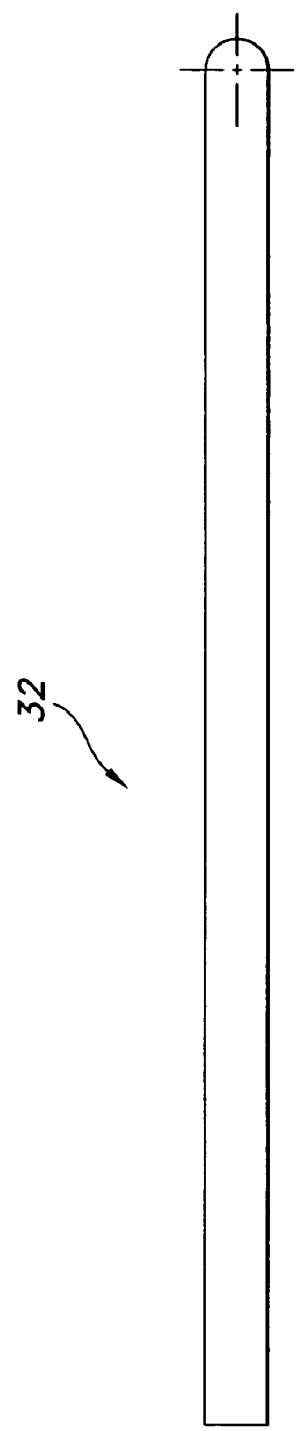
FIG. 9A is a side view of the reinforcement member component of the heat exchange assembly illustrated in FIGS. 2A and 5A.
Figure 9B:
FIG. 9B is an end view of the reinforcement member illustrated in FIG. 9A.

FIGS. 9A and 9B illustrate the cylindrical shape of the reinforcement member 32. However, the reinforcement member 32 of the present invention is not limited to a circular cross-section, and may include a square cross-section or any other suitable shape that provides rigidity. The reinforcement member 32 is configured to extend through a slot "G" in a head 56 (described subsequently with reference to FIGS. 11A and 11B). The reinforcement member 32 is made from carbon steel such as C1010 HRS (Hot Rolled Steel) material. However, the reinforcement member 32 of the present invention is not limited to carbon steel, and may be made from any other suitable metallic or non-metallic material rigid enough to reduce movement of the tube 14 with respect to the water storage tank 12 along the second direction "B."

The fittings 18 and the reinforcement member 32 cooperate to provide support for the tube 14, resulting in improved structural integrity of the water heating system 30. The fittings 18 are configured to secure the end portions 16 of the tube 14 along horizontal axis "A" and vertical axis "B." The reinforcement member 32 is configured to secure the tube coiled portion 15 along vertical axis "B" at a location that is spaced from the fittings 18. Reinforcement member 132 (FIG. 5A) also serves this function. As described previously, the structural strength and integrity of the heat exchange assembly 10 placement within the water tank 12 contributes to the overall performance and reliability of the water heating system 30.

FIGS. 10A and 10B illustrate the cylindrical shape of the support member 44. However, the support member 44 of the present invention is not limited to a circular cross-section, and may include a square cross-section or any other suitable shape that provides rigidity. A washer 54 is attached to an end of the support member 44. The washer 54 of each support member 44 provides a hanging device for the heat exchange assembly 10 during the manufacturing process. A handling device may be hooked into each washer 54 to hang the heat exchange assembly 10 upside down. The heat exchange assembly 10 is then treated and/or positioned within the water tank, as will be described subsequently in greater detail with reference to an exemplary method of manufacture. The support member 44 is made from carbon steel such as C1010 HRS material. However, the support member 44 of the present invention is not limited to carbon steel, and may be made from any other suitable metallic or non-metallic material rigid enough to keep the convolutions of the coiled tube 14 spaced evenly apart.

Figures 11A, 11B:
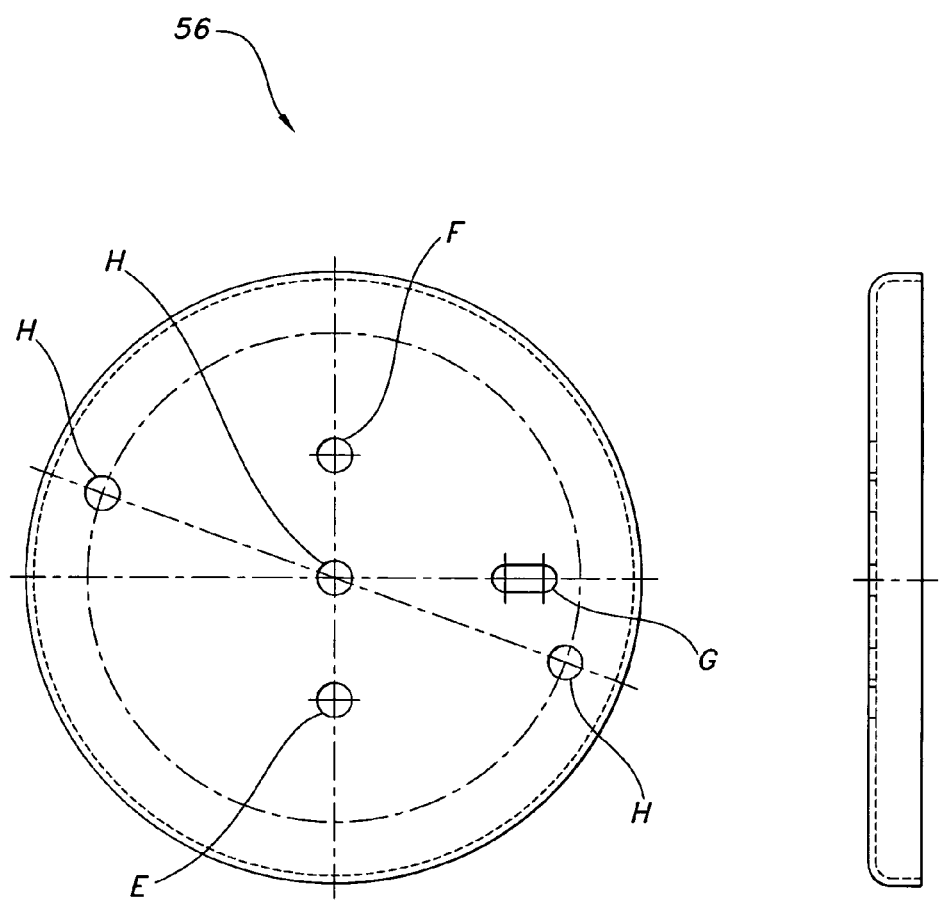

FIGS. 11A and 11B illustrate the head 56 of head assembly 34 for commercial applications. The head 56 provides a covering for the water tank 12 (as illustrated in FIG. 1). Holes "H" accommodate the sacrificial anodes 42. Hole "E" accommodates the cold water supply 38, and hole "F" accommodates the hot water outlet 40. Slot "G" accommodates the reinforcement member 32. The locations of holes "D," "E," "F," and slot "G" vary for residential and commercial applications, as will be described subsequently with reference to FIGS. 13 and 14. The head 56 is made from carbon steel such as C1010 HRS material. However, the head 56 of the present invention is not limited to carbon steel, and may be made from stainless steel, or any other suitable material.

Figure 12B:
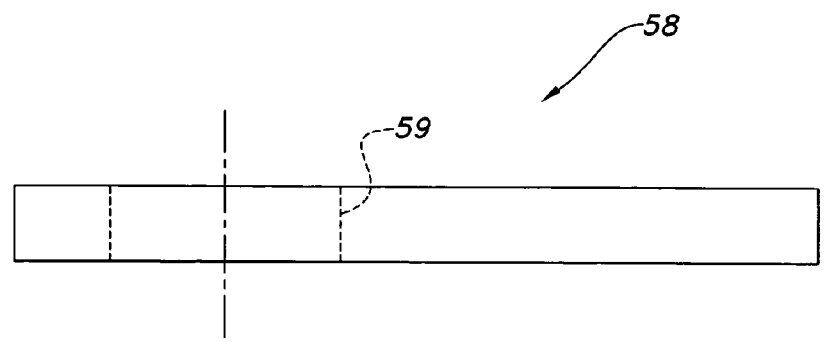
FIG. 12B is a side view of the weld plate illustrated in FIG. 12A.
Figure 12A:
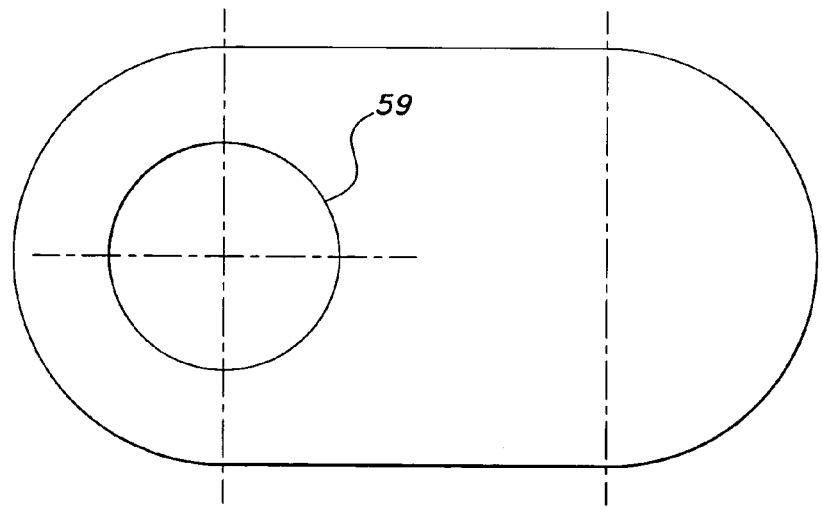
FIG. 12A is a top view of a weld plate component of the water heating system illustrated in FIG. 1.

FIGS. 12A and 12B illustrate a weld plate 58. The weld plate 58 is utilized to secure the reinforcement member 32 within the water tank 12. The configuration will be described subsequently with reference to FIG. 15. An opening 59 is provided to receive an end portion of reinforcement member 32. The weld plate 58 is made from carbon steel such as A36 HRS material. However, the weld plate 58 of the present invention is not limited to carbon steel, and may be made from stainless steel, or any other suitable metallic or non-metallic material.

Figure 13:
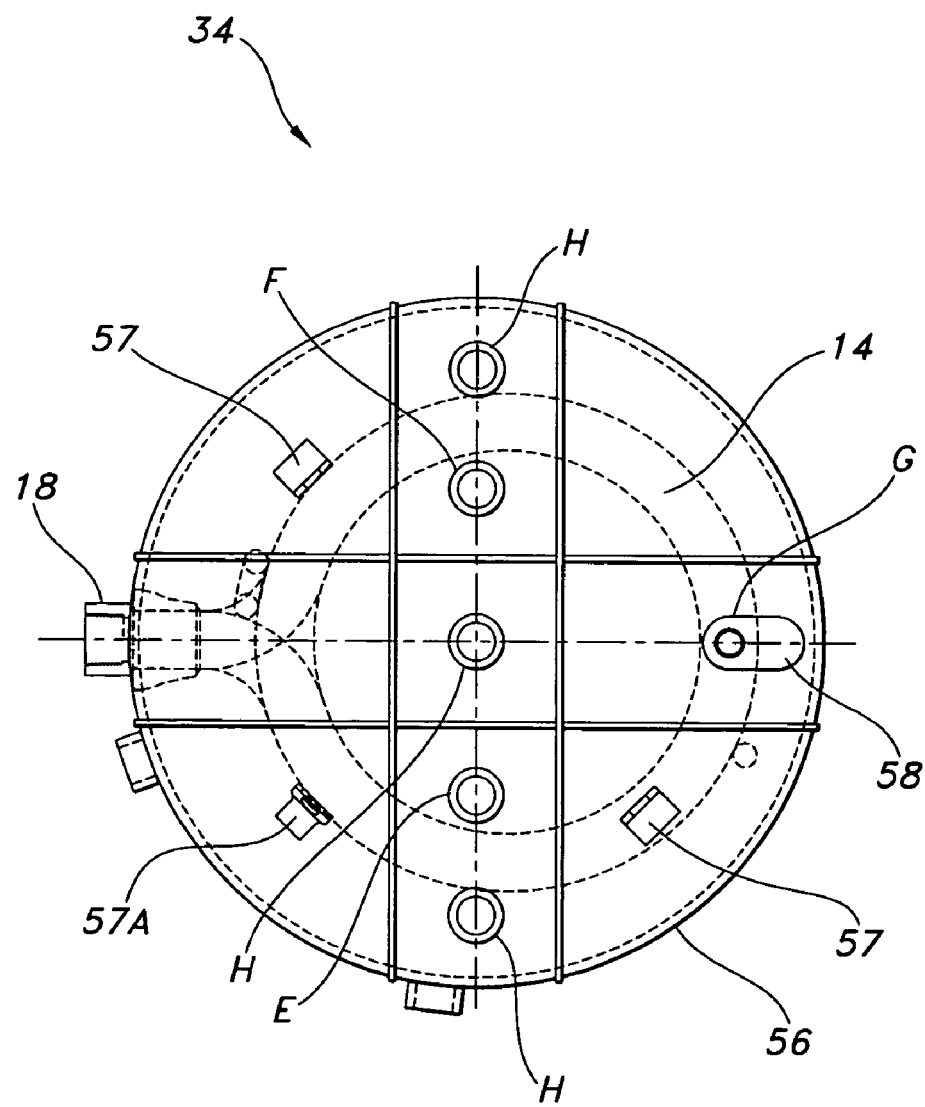
FIG. 13 is a top view of an exemplary embodiment of a system for heating water including the heat exchange assembly illustrated in FIG. 2A or 5A according to aspects of this invention.

FIG. 13 is a top view of the heat exchange assembly 10, more specifically illustrating the head assembly 34 for residential or commercial applications. Unlike the configuration of the head 56 as described previously with reference to FIGS. 11A and 11B, holes "D," "E," and "F" are aligned along a single plane as represented in FIG. 13. Slot "G" is configured toward the outer circumference of the head 56 to accommodate the reinforcement member 32. Holes "H" accommodate the sacrificial anodes 42. Hole "E" accommodates the cold water supply 38, and hole "F" accommodates the hot water outlet 40. Slot "G" accommodates the reinforcement member 32.

Figure 14:
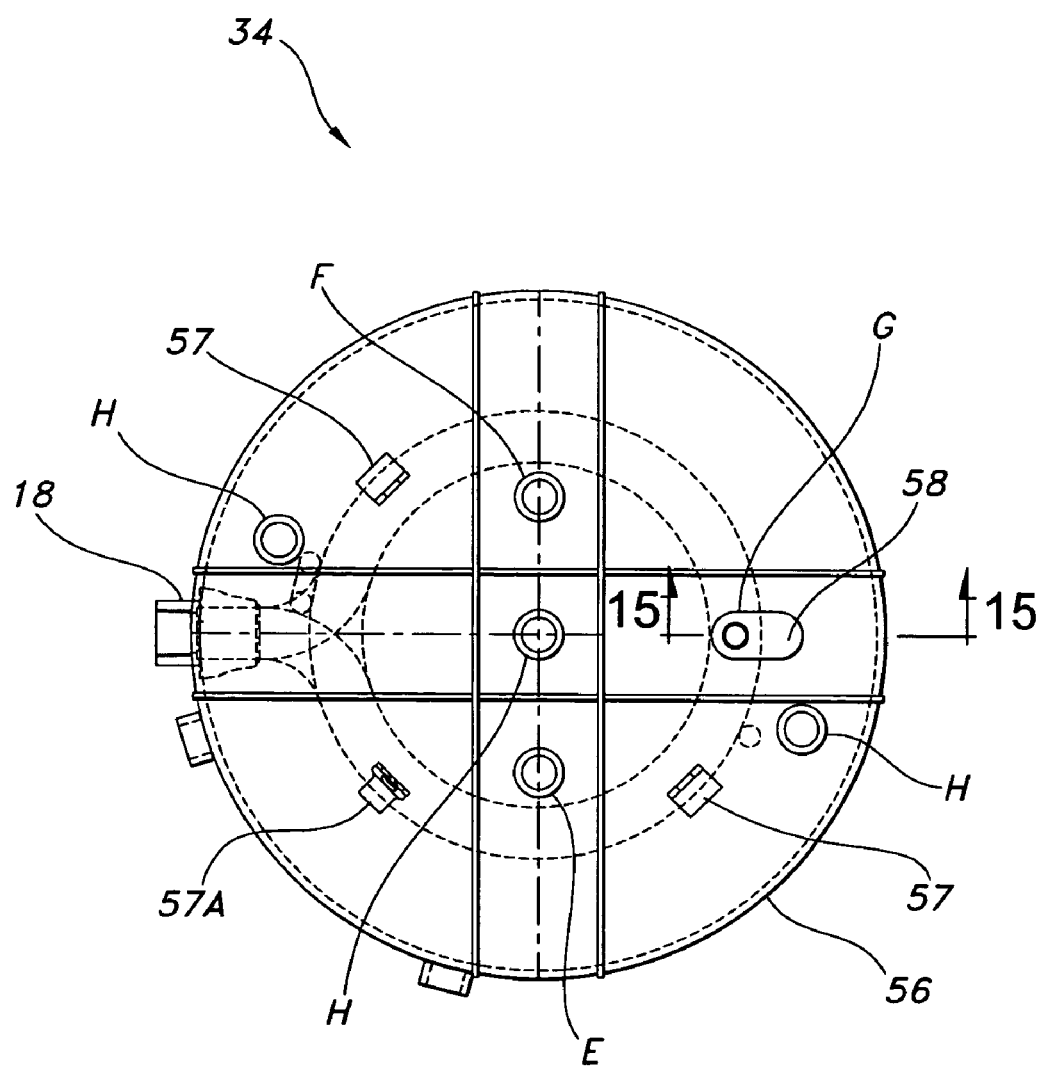
FIG. 14 is a top view of another exemplary embodiment of a system for heating water including the heat exchange assembly illustrated in FIG. 2A or 5A according to aspects of this invention.

In contrast, FIG. 14 illustrates that for residential or commercial applications having a larger diameter, slot "G" is configured closer toward the center of the head 56 to accommodate the reinforcement member 32. Holes "H" accommodate the sacrificial anodes 42. Hole "E" accommodates the cold water supply 38, and hole "F" accommodates the hot water outlet 40. Slot "G" accommodates the reinforcement member 32.

Tank hangers 57 are optionally provided on the head 56 to hold the assembly 34 of the head and shell of the water heater (i.e., the tank 12 without the heat exchange assembly 10 and the tank base 35) as the head and shell assembly is advanced through a furnace for glassing. An additional tank hanger 57A can also be provided on the head 56 so that the assembly can be lifted once the assembly exits the furnace. Such hangers 57 and 57A can also be used to position the assembly with respect to the jacket 36 and base 35 of the water heater as the completed water heater assembly 30 is formed.

Figure 16:
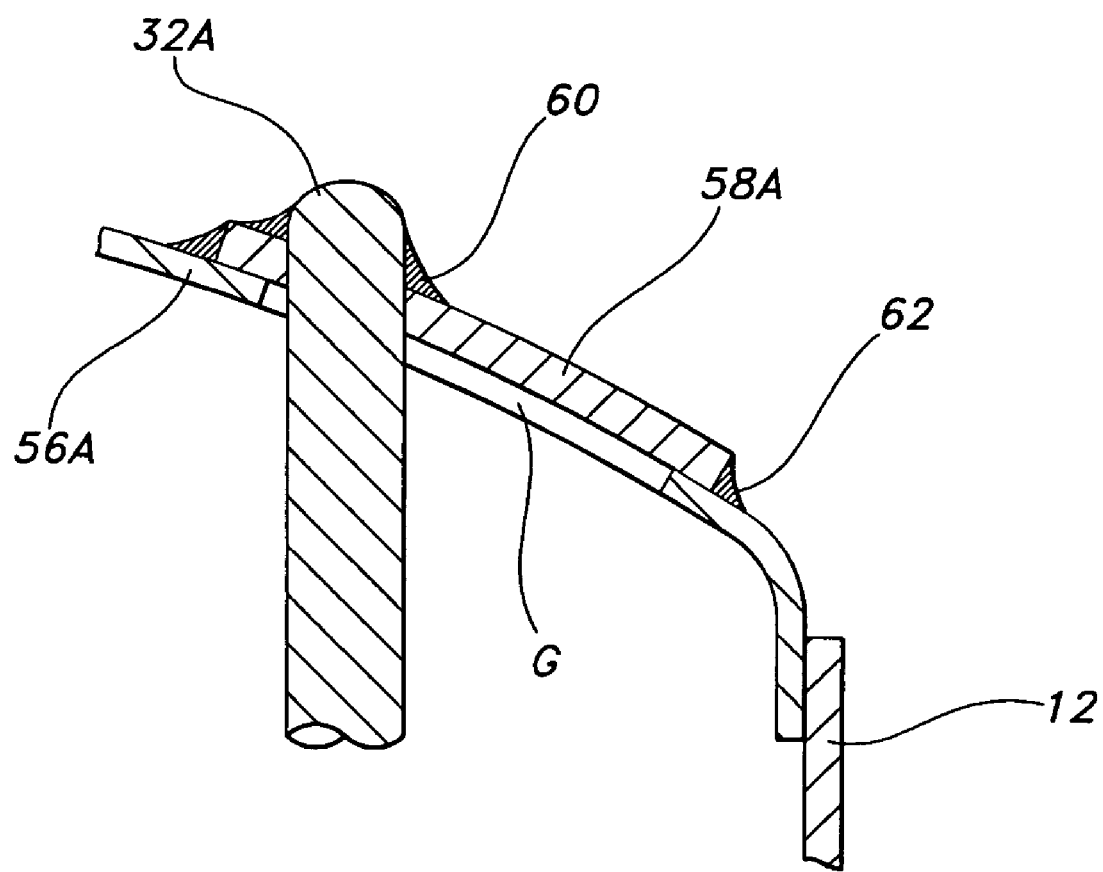
FIG. 16 is a cross-sectional detail view illustrating another embodiment of the weld plate of FIG. 12A securing the reinforcement member of FIG. 9A to the water tank head of FIG. 11A.

As illustrated in FIG. 16, the flat heads 56 shown in FIGS. 13 and 14 can be substituted by domed heads 56A.

Figure 15:
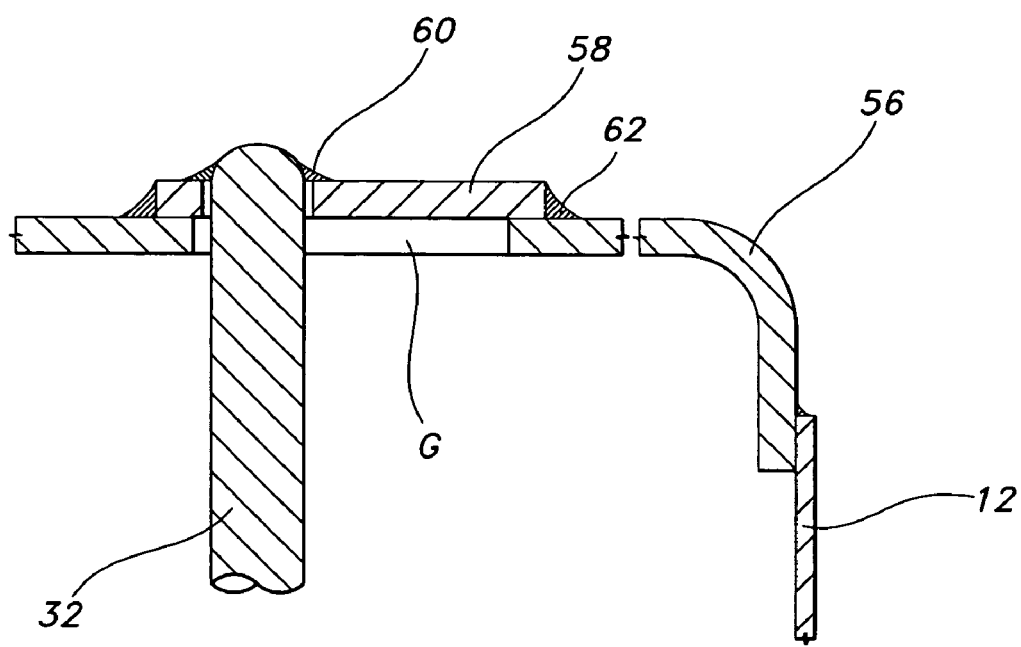
FIG. 15 is a cross-sectional detail view illustrating the weld plate of FIG. 12A securing the reinforcement member of FIG. 9A to the water tank head of FIG. 11A.

FIG. 15 is a cross-sectional detail view illustrating the weld plate 58 securing the reinforcement member 32 to the head 56 of the water tank 12. The reinforcement member 32 protrudes through slot "G" of the head 56. The weld plate 58 is welded to the head 56, and the reinforcement member 32 is welded to the weld plate 58. Welds 60 and 62 secure the reinforcement member 32 to the weld plate 58 and secure the weld plate 58 to the head 56, respectively.

FIG. 16 is a cross-sectional detail view illustrating another embodiment of a weld plate 58A securing a reinforcement member 32A to the head 56A of a water tank 12. This configuration differs from that illustrated in FIG. 15 in that the head 56A is domed whereas the head 56 of FIG. 15 is substantially flat. Accordingly, the weld plate 58A is optionally curved to conform to the surface of the domed head 56A. Additionally, the aperture formed in the weld plate 58A is optionally formed at an angle to the surfaces of the weld plate 58A so as to support the reinforcement member 32A in a substantially vertical orientation. The reinforcement member 32A protrudes through slot "G" of the head 56A and through the aperture in the weld plate 58A. The weld plate 58A is welded to the head 56A at weld 62, and the reinforcement member 32A is welded to the weld plate 58A at weld 60.

An exemplary method of manufacture of the system 30 for heating water having a water storage tank 12 adapted to contain a heat exchange assembly 10 includes inserting the heat exchange assembly 10 through an open bottom of the water storage tank 12 utilizing a handling device. As described previously, each support member 44 of the heat exchange assembly 10 includes a washer 54 that provides a hanging device for the heat exchange assembly 10. A handling device may be hooked into each washer 54 to hang the heat exchange assembly 10 upside down.

As the heat exchange assembly 10 is inserted through the open bottom of the water storage tank 12, the reinforcement member 32 protrudes through slot "G" of the head assembly 34 at a location toward the outer circumference of the head 56 as the fittings 18 are inserted into openings 22. The heat exchange assembly 10 is then shifted toward the openings 22 in the water tank 12 and is positioned such that the fittings 18 extend through the openings 22. The shape and orientation of slot "G" accommodates the movement of the reinforcement member 32 toward the center of the head 56. The fittings 18 are welded in position to the water tank 12, and the reinforcement member 32 is secured to the head 56 of the water tank 12 via the weld plate 58. As described previously with reference to FIG. 15, the weld plate 58 is welded to the head 56, and the reinforcement member 32 is welded to the weld plate 58. When the heat exchange assembly 10 is properly positioned and secure within the water heating system 30, the base 35 may be welded to the bottom of the water tank 12.

In use, according to one exemplary embodiment of the invention, heated fluid (e.g., heater water or steam) enters the water heater through the top or bottom fitting 18. If steam is delivered to the water heater from a steam boiler, for example, the steam may enter the water heater through the top fitting 18. The steam (and/or condensation) would travel downwardly through the coiled tube 15 of the heat exchange assembly 10 and then exit the water heater through the bottom fitting 18.

In a hydronic system, water can enter the water heater through either the bottom or top fitting 18. If heated water enters through the bottom fitting, for example, the water travels upwardly through the coiled tube 15 of the heat exchange assembly 10 perhaps aided by convection currents. Heat is transferred to potable water within the water storage tank 12 from heated non-potable water circulated through the coiled tube 15 of the heat exchange assembly 10. The water then exits through the top fitting 18 and travels to the space heating system, a heat source, or another destination. This water is continuously circulated through the system, as needed. The circulating water preferably enters through the top fitting 18 and exit through the bottom fitting 18.

While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

What is claimed:

1. A heat exchange assembly adapted for use in a water tank, said heat exchange assembly comprising:
    a tube having end portions and a coiled portion between said end portions; and
    a fitting connected to at least one of said end portions of said tube, said fitting having an end configured to extend through an opening in the water tank and a surface positioned to limit the extension of said end through the opening in the water tank, and said fitting also having an opposite end defining a bore configured to receive one of said end portions of said tube and to limit the extension of said end portion of said tube into said opposite end of said fitting, wherein said bore extends axially beyond said surface.

2. The heat exchange assembly of claim 1, wherein said surface of said fitting is an exterior annular shoulder.

3. The heat exchange assembly of claim 2, wherein said fitting further comprises an outer surface tapered from said exterior annular shoulder toward said opposite end.

4. The heat exchange assembly of claim 1, wherein said bore of said fitting comprises a counterbore defining an interior annular shoulder.

5. The heat exchange assembly of claim 1, wherein said fitting is welded to said tube.

6. The heat exchange assembly of claim 1, wherein said end of said fitting defines female threads.

7. The heat exchange assembly of claim 1 comprising a fitting connected to each of said end portions of said tube, each said fitting having an end configured to extend through an opening in the water tank and a surface positioned to limit the extension of said end through the opening in the water tank, and each said fitting also having an opposite end defining a bore configured to receive one of said end portions of said tube and to limit the extension of said end portion of said tube into said opposite end of said fitting.

8. A coiled heat exchanger configured for use in a water heater, said coiled heat exchanger comprising:
    a coiled tube for directing the flow of fluid through said heat exchanger, said coiled tube having a tube outer diameter and a coil inner radius;
    wherein said outer diameter of said $1\frac{1}{8}$ inches or greater and the ratio of said outer diameter of said tube to said coil inner radius is about 0.19:1 or greater.

9. The coiled heat exchanger of claim 8 wherein said outer diameter of said tube is about $1\frac{1}{4}$ inches or greater.

10. The coiled heat exchanger of claim 8 wherein said outer diameter of said tube is about $1\frac{1}{2}$ inches or greater.

11. The coiled heat exchanger of claim 8 wherein said ratio of said outer diameter of said tube to said coil inner radius is about 0.25:1 or greater.

12. The coiled heat exchanger of claim 11 wherein said outer diameter of said tube is about $1\frac{1}{8}$ inches or greater.

13. The coiled heat exchanger of claim 11 wherein said outer diameter of said tube is about $1\frac{1}{4}$ inches or greater.

14. The coiled heat exchanger of claim 11 wherein said outer diameter of said tube is about $1\frac{1}{2}$ inches or greater.

15. The coiled heat exchanger of claim 8 wherein said ratio of said outer diameter of said tube to said coil inner radius is about 0.3:1 or greater.

16. The coiled heat exchanger of claim 15 wherein said outer diameter of said tube is about $1\frac{1}{8}$ inches or greater.

17. The coiled heat exchanger of claim 15 wherein said outer diameter of said tube is about $1\frac{1}{4}$ inches or greater.

18. The coiled heat exchanger of claim 15 wherein said outer diameter of said tube is about $1\frac{1}{2}$ inches or greater.

19. A coiled heat exchanger configured for use in a watr heater, said coiled exchanger comprising:
    a coiled tube for directing the flow of fluid thrugh said heat exchanger;
    a support member contacting coils of said coiled tube, wherein said support member is connected to coils of said coiled tube on alternating sides of said support member.

20. The coiled heat exchanger of claim 19, wherein said coils are spaced apart.

21. The coiled heat exchanger of claim 20, wherein said coils are spaced evenly apart.

22. The coiled heat exchanger of claim 19, wherein said support member is connected to each of said coils of said coiled tube.

23. The coiled heat exchanger configured of claim 19, wherein said support member is welded to coils of said coiled tube on alternating sides of said support member.

24. A system for heating water, said water heating system comprising:
- a water storage tank adapted to contain a water supply;
- at least one tube connected to contain a recirculating water supply, said tube being mounted within said water storage tank, said tube having at least one end portion fixed with respect to said water storage tank and a coiled portion extending from said end portion;
- a fitting connected to said end portion of said tube and to said water storage tank, said fitting being oriented along a first direction and configured to reduce movement of said end portion of said tube with respect to said water storage tank along said first direction;
- a reinforcement member coupled to said coiled portion of said tube and to said water storage tank, said reinforcement member being oriented along a second direction substantially perpendicular to said first direction and configured to reduce movement of said coiled portion of said tube with respect to said water storage tank along said second direction; and
- a support member, seperate from said reinforcement member, contacting coils of said coiled portion of said tube.

25. The water heating system of claim 24, wherein said fitting comprises an exterior annular shoulder positioned to orient said fitting with respect to said water tank along said first direction.

26. The water heating system of claim 25, wherein said fitting further comprises an opposite end defining a bore configured to receive an end portion of said tube and to limit the extension of said end portion of said tube into said opposite end of said fitting, wherein said bore extends axially beyond said exterior annular shoulder.

27. The water heating system of claim 26, wherein said bore of said fitting defines an interior annular shoulder.

28. The water heating system of claim 26, wherein said fitting further comprises an outer surface tapered from said exterior annular shoulder to said opposite end.

29. The water heating system of claim 24, wherein said fitting is welded to said tube.

30. The water heating system of claim 24, wherein said tube is coiled.

31. The water heating system of claim 30, said coiled tube having a tube outer diameter and a coil inner radius, wherein the ratio of said outer diameter of said coiled tube to said coil inner radius is about 0.19:1 or greater.

32. The water heating system of claim 24, wherein said reinforcement member is welded to a surface of said tube.

33. The water heating system of claim 24, wherein said reinforcement member is welded to a surface of said water storage tank.

34. In a system for heating water having a water storage tank adapted to contain a water supply and a tube assembly connected to contain a recirculation water supply, a method for mounting the tube assembly within the water storage tank comprising the steps of:
- inserting the tube assembly into the water storage tank along a first direction;
- extending a portion of a fitting of the tube assembly through a wall of the water storage tank from within the water storage tank along a second direction at an angle to the first direction;
- coupling the fitting of the tube assembly to the water storage tank along the second direction, thereby reducing movement of the tube assembly with respect to the water storage tank along the second direction; and
- attaching a reinforcement member of the tube assembly to the water storage tank along the first direction, thereby reducing movement of the tube assembly with respect to the water storage tank along the first direction.

35. The method of claim 34, further comprising the step of coupling a fitting to a tube.

36. The method of claim 34, further comprising the step of attaching a reinforcement member to a tube.

37. The method of claim 34, further comprising the steps of:
- extending an end of the reinforcement member through an orifice in the water storage tank along the first direction; and
- advancing an end of the fitting through an orifice in the water storage tank along the second direction.

38. The method of claim 34, said coupling step comprising welding the fitting to a surface of the water storage tank.

39. The method of claim 34, said attaching step comprising welding the reinforcement member to a surface of the water storage tank.

* * * * *